United States Patent [19]

Shibata et al.

[11] 4,421,187
[45] Dec. 20, 1983

[54] TRANSMISSION WITH ALIGNABLE BEARING SUPPORTING LONGER POWER OUTPUT SHAFT OF DIFFERENTIAL

[75] Inventors: Takuo Shibata, Toyota; Mitsugu Izuta, Okazaki; Tetsuya Matano, Toyota, all of Japan

[73] Assignee: Toyota Jidosha Kabushiki Kaisha, Toyota, Japan

[21] Appl. No.: 279,569

[22] Filed: Jul. 1, 1981

[30] Foreign Application Priority Data

Jul. 31, 1980 [JP] Japan .................................. 55-105265

[51] Int. Cl.³ ............................................. B60K 17/24
[52] U.S. Cl. ................................. 180/73 D; 180/297; 384/255
[58] Field of Search ............... 180/297, 73 D; 74/701; 308/62; 384/255

[56] References Cited

U.S. PATENT DOCUMENTS

| | | | |
|---|---|---|---|
| 657,381 | 9/1900 | Barnes | 180/297 |
| 2,782,864 | 2/1957 | Fessia | 180/297 |
| 4,252,059 | 2/1981 | Simeth | 308/62 |

Primary Examiner—John A. Pekar
Assistant Examiner—D. Lynn Fugate
Attorney, Agent, or Firm—Stevens, Davis, Miller & Mosher

[57] ABSTRACT

A vehicle has two axially opposed driven wheels which are driven by two drive shafts of equal length, each flexibly drivingly coupled at its outer end to one of the wheels. A differential, which has a preferred power output line, is located closer to a first one of the wheels and further from the other wheel. A short power output shaft extends from the differential towards the first wheel and is flexibly drivingly coupled at its outer end to the inner end of the drive shaft which drives that first wheel. A long power output shaft extends from the differential towards the other wheel and is flexibly coupled at its outer end to the inner end of the other one of the drive shafts, whose outer end is drivingly coupled to that other wheel. The inner race of a bearing supports an outer part of the long power output shaft, remote from the differential, and an outer race rotatably supports the inner race. A support member supports the outer race so that the inner race is rotatable about a rotation axis substantially parallel to the preferred power output line for the differential on the long power output shaft side, and this support member is coupled to a fixed member of the vehicle. A means for alignment is provided, for adjusting the position of the rotation axis of the inner race with respect to the position of the preferred power output line on that side of the differential, in the plane perpendicular thereto, with two degrees of freedom, and for fixing this adjusted position. Accordingly, the long power output shaft is firmly rotatably held in a position which can be adjusted and then fixed.

11 Claims, 5 Drawing Figures

TRANSMISSION WITH ALIGNABLE BEARING SUPPORTING LONGER POWER OUTPUT SHAFT OF DIFFERENTIAL

BACKGROUND OF THE INVENTION

The present invention relates to a power transmission device for a vehicle, and, more particularly, relates to a power transmission device for a vehicle with two axially opposed driven wheels, in which a differential is provided between these driven wheels and is axially located closer to one of these wheels and further from the other of them—i.e. in an asymmetrical location relative to the wheels.

In the case of a vehicle provided with a transversely mounted engine, especially in the case of a vehicle of the front engine front wheel drive type or the so called FF type, it is very common for the differential device which transmits power from the gearbox of the vehicle to the driven wheels thereof, and which provides differential action between said driven wheels, to be displaced to one side or to the other side of the longitudinal axis of the vehicle, i.e. for this differential device to be closer to one of the driven wheels and further from the other of the driven wheels. This is because of the limited space available in the engine compartment of such a vehicle, due to the transverse mounting of the engine therein, and to the relative alignment of the various units in the power train of the vehicle, and is a well known matter in the automotive art.

The question then arises as to how the rotary power is to be transmitted from such an asymmetrically positioned differential to these driven wheels of the vehicle. Such a differential is usually provided with left and right power output shafts which extend in opposite directions to the left and the right sides thereof. Further, it is an almost inevitable constructional fact that the differential will have a so called preferred power output line, on each of its sides, these lines being typically defined by the rotational axes of some internal members of the differential. (It is common for the preferred power output lines on the left and the right sides of the differential, in fact, to be coincident.) In other words, it will be preferred, for proper operation of the differential, and for good reliability thereof and quietness in operation, that the power output shaft on each side should be maintained with its central rotational axis substantially coincident with the aforesaid preferred power output line on that side. If one or the other of the power output shafts should be undesirably slanted out of the preferred power output line on its side, so that its central rotational axis lies at a substantial non zero angle to said preferred power output line, then the reliability of the differential will be much deteriorated during use, due to excessive side strains being imposed on bearing devices in the differential, and mutual misalignment of gears therein, and further there is a danger that a loud noise such as a humming noise will be caused during operation of the vehicle in which the differential is fitted, which is troublesome and annoying. In a severe case, also, it is possible for quite high amplitude vibration to be generated during operation of the transmission, which of course is completely unacceptable.

If the left and the right power output shafts of the differential are of the same length, and if the end of each of these power output shafts is connected to its respective driven wheel by a dirve shaft and by constant velocity universal joints which may be Cardan joints, then, since the differential is offet towards one side of the vehicle, therefore the left and the right drive shafts will necessarily be of different lengths, and these drive shafts will necessarily bend downwards at different angles, and will be connected to the driven wheels at different angles. This means that during acceleration of the driven wheels, and also, when the driven wheels are the front wheels of the vehicle and are also used for steering the vehicle, during progress around a curve, then the difference in the torques provided to these driven wheels of the vehicle, when the steering geometry changes as it inevitably will in such circumstances, will cause asymmetrical acceleration and steering characteristics for the vehicle. For example, it may be the case that a tendency may arise for the vehicle, during acceleration, to steer towards the side on which the drive shaft is shorter. This deteriorates straight ahead drivability of the vehicle, causes dangerous handling thereof, and accordingly is quite unacceptable.

In view of the above described problem, a constructional solution has been proposed for a power transmission with such an asymmetrically located differential, in which the left and right drive shafts are of equal lengths, and bend downwards at the same angles, and on the side of the vehicle on which the distance between the differential and the driven wheel is the shorter the inner end of the drive shaft is directly connected to the outer end of the power output shaft of the differential by a constant velocity universal joint which may be a Cardan joint, while on the side of the vehicle on which the distance between the differential and the driven wheel is the greater the inner end of the drive shaft is connected to the outer end of an intermediate shaft, the inner end of which is connected to the outer end of the power output shaft of the differential on that side. In this case, this intermediate shaft may be supported, via bearings, by some fixed member of the vehicle.

In such a construction, the angles down through which the left and the right drive shafts incline are the same, and accordingly the left and the right driven wheels are provided with equal steering torques, accordingly eliminating asymmetrical steering and driving characteristics of the vehicle; but on the other hand, because the power output shaft of the differential on the side on which the differential is further from its driven wheel needs to be connected to the intermediate shaft via a third universal joint such as a Cardan joint, in order to compensate for manufacturing tolerances in the alignment of the rotational axis provided for the intermediate shaft by the means for supporting the intermediate shaft, and the rotational axis of the power output shaft on that side of the differential, which as stated above ought to lie substantially along the preferred power output line of the differential on that side, thereby the number of mechanical components required for the transmission is increased, and according to this increase in complexity the cost of the transmission is increased and the difficulty of manufacture thereof becomes higher. Further, the reliability of the transmission is decreased, and further problems arise such as an increase in weight, and an increase in the slack in the power train caused by the additional splined joints in the power train, which causes a risk of producing a clonking noise from the transmission, especially when starting the vehicle from rest. Accordingly, such a solution, although it has been practiced, is by no means perfect.

SUMMARY OF THE INVENTION

Therefore, in order to cope with these problems, it could be considered for no such intermediate shaft to be used, but instead for the power output shaft of the differential on the side where the differential is further from its driven wheel to be longer than the power output shaft of the differential on the side where the differential is closer to its driven wheel, so that on both sides the power output shafts of the differential would be directly connected to their appropriate drive shafts by constant velocity universal joints which may be Cardan joints, both of these drive shafts being of the same lengths and angling downwards at the same angles. This solution would be effective for minimizing the number of universal joints in the power train, and for ensuring that no asymmetrical steering characteristics or driving characteristics of the vehicle should be caused. However, in order to provide sufficient rigidity for the support of the extended power output shaft of the differential on the side where the differential would be further from its driven wheel, in order thereby to maintain the central rotational axis of this power output shaft substantially coincident with the preferred power output line of the differential on its side, it would be necessary for this long power output shaft to be rotatably supported near its outer end.

A way in which this could be done would be to support the outer end of this long power output shaft by a simple bearing device supported by a bracket mounted to a fixed member such as the engine block of the vehicle. A problem however would arise in this case, in that, since the central axis of the long power output shaft would need to be maintained as substantially coincident with the above described preferred power output line of the differential, in order to avoid rapid wear on the internal parts of the differential and on the bearing device, and in order to avoid noise during operation, a high dimensional accuracy would be required for the aforesaid bracket mounted to the fixed member such as the engine block, and even then, inevitably, in practice during assembly of the power train of the vehicle an adjustment operation would be necessary. The question therefore would arise as to how such an adjustment operation should be carried out. If the means provided for adjustment, for example, were a simple provision of shims between the bracket mounted to the fixed member such as the engine block, and/or provision of variability in the mounting position of the bracket to the fixed member such as the engine block (which might be, for example, provided by bolting the bracket to the fixed member by bolts which passed through holes in the bracket which were bigger than the shanks of the bolts, so that a certain degree of adjustment was possible before tightening up of the bolts), then such an adjustment operation would be difficult, and unpredictable, and would require repeated removal of the bracket from the fixed member such as the engine block, in order to attain final proper adjustment. This would be troublesome and costly, and further would cause servicing problems for the vehicle during use, which might very probably cause a tendency to deteriorate the reliability of such a transmission. That is, if the transmission and/or the engine of such a vehicle should require to be removed from the vehicle for major servicing, or for replacement or the like, then, when the vehicle was being reassembled, it would be necessary to readjust the aforesaid bracket, in order to provide for proper alignment of the long power output shaft. This would be difficult and troublesome, especially for a workplace or garage which was not very fully equipped; and of course, if this adjustment operation were not carried out, or were carried out improperly, then quick deterioration and eventual failure of the transmission would inevitably result, due to strain on and misalignment of the parts thereof.

Accordingly, it is an object of the present invention to provide a power transmission of a general construction such as described above, in which the differential is asymmetrically placed between the driven wheels of a vehicle to which the transmission is mounted, and in which the power output shafts of the differential are of unequal lengths, and are directly connected to drive shafts of equal length which drive the driven wheels of the vehicle and which angle downwards through the same angles, in which the longer power output shaft of the differential is braced by a particular simple and rigid construction.

It is a further object of the present invention to provide such a transmission as described above, in which the bracing construction can be simply and easily adjusted.

It is a further object of the present invention to provide such a transmission as described above, in which no undue number of universal joints need be used.

It is a further object of the present invention to provide such a transmission as described above, in which no unduly high machining accuracy is required for the various parts of the bracing construction.

It is a further object of the present invention to provide such a transmission as described above, in which the slack in the power train is minimized.

It is a further object of the present invention to provide such a transmission as described above, of which the reliability during use should be good.

It is a further object of the present invention to provide such a transmission as described above, in which the weight is kept as low as possible.

It is a further object of the present invention to provide such a transmission as described above, in which the occurrence of vibration during use is rendered as unlikely as possible.

It is a further object of the present invention to provide such a transmission as described above, in which manufacturing complexity is not significantly increased.

It is a yet further object of the present invention to provide such a transmission as described above, in which no unreasonably high dimensional accuracy is required for the various parts thereof during manufacture.

It is a yet further object of the present invention to provide such a transmission as described above, in which the manufacturing cost is kept as low as possible.

It is a yet further object of the present invention to provide such a transmission as described above, in which no disagreeable noise such as a humming noise is liable to be produced during operation of the transmission.

It is a yet further object of the present invention to provide such a transmission as described above, in which no annoying noise such as a clonking noise is liable to be produced during operation of the transmission, especially when starting the vehicle incorporating the transmission from rest.

It is a yet further object of the present invention to provide such a transmission as described above, comprising a means for adjusting the position of a bearing device which supports a part of the long power output shaft remote from the differential.

It is a yet further object of the present invention to provide such a transmission as described above, comprising a means for adjusting the position of a bearing device which supports a part of the long power output shaft remote from the differential, in which the position of the rotation axis of the inner race of the bearing device can be adjusted, in the plane perpendicular to said rotation axis, with two degrees of freedom.

It is a yet further object of the present invention to provide such a transmission as described above, comprising a means for adjusting the position of a bearing device which supports a part of the long power output shaft remote from the differential, in which the position of the rotation axis of the inner race of the bearing device can be adjusted, in the plane perpendicular to said rotation axis, over the entire area of a circle.

It is a yet further object of the present invention to provide such a transmission as described above, comprising a means for adjusting the position of a bearing device which supports a part of the long power output shaft remote from the differential, in which the adjustment can be fixed by attaching a locating plate to the adjustment means, after adjusting the adjustment means.

It is a yet further object of the present invention to provide such a transmission as described above, comprising a means for adjusting the position of a bearing device which supports a part of the long power output shaft remote from the differential, in which the adjustment can be fixed by attaching a locating plate to the adjustment means, after adjusting the adjustment means, and in which the locating plate can be permanently prepared by a mechanic or the like so as to permanently fix the adjusting means at a particular adjustment.

It is a yet further object of the present invention to provide such a transmission as described above, comprising such a locating plate, in which the locating plate can be easily and conveniently changed for a new locating plate, in order to readjust the adjusting means, during servicing of the vehicle incorporating the transmission.

According to the present invention, these and other objects are accomplished by, in a vehicle comprising two axially opposed driven wheels and a fixed member, a transmission comprising: (a) two drive shafts of equal length, each flexibly drivingly coupled at its outer end to one of said wheels; (b) a differential axially located closer to a first one of said wheels and further from the one of said wheels, defining a preferred power output line for power output to said other one of said wheels, and comprising (b1) a short power output shaft extending towards said first wheel and flexibly drivingly coupled at its outer end to the inner end of the one of said drive shafts whose outer end is drivingly coupled to said first wheel; and (b2) a long power output shaft extending towards said other wheel substantially along said preferred power output line and flexibly drivingly coupled at its outer end to the inner end of the one of said drive shafts whose outer end is drivingly coupled to said other wheel; and (c) a support device comprising: (c1) a bearing, comprising an inner race which supports a part of said long power output shaft remote from said differential, and an outer race which rotatably supports said inner race; (c2) a support member, which supports said outer race of said bearing so that said inner race is rotatable about a rotational axis substantially parallel to said preferred power output line, and which is coupled to said fixed member of said vehicle; and (c3) a means for adjusting the position of said rotational axis of said inner race of said bearing with respect to the position of said preferred power output line, in the plane perpendicular to said rotation axis of said inner race, with two degrees of freedom, and for fixing said adjusted position; (d) whereby, by adjusting said adjusting means so as to bring said rotational axis of said inner race of said bearing, and also the rotational axis of said long power output shaft of said differential which is supported thereby, to be substantially coincident with said preferred power output line of said differential, thus compensating for offset in the positioning of said support member, power output from said differential to said long power output shaft may be performed substantially along said preferred power output line, thus minimizing wear on, and maximizing the lifespan of, said differential, and also minimizing side strain on said bearing.

By this arrangement, before said adustment means is fixed, the position of the rotation axis of the inner race can be adjusted as required with respect to the position of said preferred power output line, so as to bring said axis into coincidence with said preferred power output line. On the other hand, after said adjustment means is fixed, said support member supports via said bearing said outer part of said long power output shaft reliably and firmly. Thereby, it is practicable to form the two drive shafts which extend to the driven wheels to be of equal lengths, even though the differential is axially offset towards said first one of said driven wheels, thus providing good operational characteristics for said vehicle and preventing asymmetrical driving of said vehicle.

BRIEF DESCRIPTION OF THE DRAWINGS

The present invention will now be shown and described with reference to a preferred embodiment thereof, and with reference to the illustrative drawings. It should be clearly understood, however, that the description of the embodiment, and the drawings, are all of them given purely for the purposes of explanation and exemplification only, and are none of them intended to be limitative of the scope of the present invention in any way, since the scope of the present invention is to be defined solely by the legitimate and proper scope of the appended claims. In the drawings:

DESCRIPTION OF THE PREFERRED EMBODIMENT

The present invention will now be described in terms of a preferred embodiment thereof, and with respect to the accompanying drawings.

Figure 1:
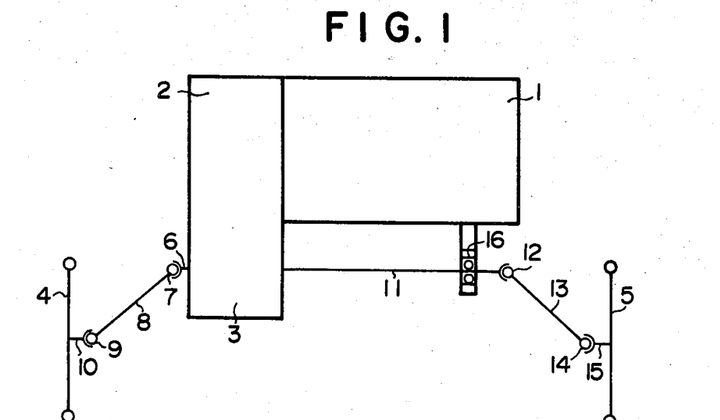
FIG. 1 is a schematic illustration, showing generally the construction of the preferred embodiment of the transmission according to the present invention, in part block diagrammatical form.

In FIG. 1, there is shown in schematic form the general construction of the preferred embodiment of the transmission according to the present invention which will now be described. Referring to this figure, the reference numeral 1 denotes the transversely mounted internal combustion engine of an automotive vehicle, which transmits rotary power to a gearbox 2 fitted on to one side of said internal combustion engine 1. The longitudinal axis of the vehicle runs perpendicular to the plane of the drawing paper in FIG. 1. Below the gearbox 2, and integral therewith, there is provided a differential device 3.

This differential device 3 is of a per se well known sort, which provides differential action between two power output shafts, and it is one of the well known characteristics of such a differential device, as explained above, that each of the power output shafts thereof ought to be extended along a preferred power output line, in order to minimize strain on various bearing components of the differential device 3 and thus in order to maximize its operating life, and also in order to minimize the noise emitted during operation of said differential device 3. In the discussions that will hereinafter be made of this transmission system, only the preferred power output line relating to the power output shaft of the differential device 3 which extends to the right side thereof in FIG. 1 is relevant, and this will be referred to as the preferred power output line of the differential device 3. In fact, it is usual that the preferred power output lines of such a differential device 3 to its two sides are coincident, but this should not be taken as limitative of the scope of the present invention.

To the left and to the right of the internal combustion engine 1 and of the gearbox 2, and somewhat below them, there are respectively positioned left and right vehicle wheels 4 and 5, and accordingly it will be seen that the internal combustion engine 1 and the gearbox 2 are transversely mounted above and between these left and right vehicle wheels 4 and 5. In fact, in the shown construction, the wheels 4 and 5 are the front wheels of the vehicle, and are steered, and accordingly this vehicle is of a transverse front engined front wheel drive type, i.e. a so called FF type.

The left hand vehicle wheel 4 is driven by a short stub axle 10 fixed to the inner side thereof, and, similarly, the right hand vehicle wheel 5 is driven by a short stub axle 15 fixed to the inner side thereof. These stub axles 10 and 15 are of equal lengths.

To the inner end of the left hand stub axle 10 there is coupled, via a constant velocity universal joint 9 which may be a Cardan joint or the like, the outer end of a left hand drive shaft 8 for driving the left hand vehicle wheel 4. Similarly, to the inner end of the right hand stub axle 15 there is coupled, via a constant velocity universal joint 14 which may be a Cardan joint or the like, the outer end of a right hand drive shaft 13 for driving the right hand vehicle wheel 5. These drive shafts 8 and 13 are of equal lengths.

From the differential 3 there extend, respectively to the left and to the right, a short left hand power output shaft 6 and a long right hand power output shaft 11. The outer end of the short left hand power output shaft 6 is coupled, via a constant velocity universal joint 7 which may be a Cardan joint or the like, to the inner end of the left hand drive shaft 8, and, similarly, the outer end of the long right hand power output shaft 11 is coupled, via a constant velocity universal joint 12 which may be a Cardan joint or the like, to the inner end of the right hand drive shaft 13. According to this construction, the excess in the length of the long right hand power output shaft 11, over the length of the short left hand power output shaft 6, compensates for the asymmetrical positioning of the differential 3, with respect to the driven wheels 4 and 5, closer to the left hand driven wheel 4 and farther from the right hand driven wheel 5, so that according to this construction, as mentioned above, the left hand drive shaft 8 may be of the same length as the right hand drive shaft 13, and the left and right hand drive shafts 8 and 13 may extend downwards at the same down slope angles. As previously mentioned, it is very desirable that the long right hand power output shaft 11 should be kept with its central axis coincident with the preferred power output line of the differential device 3, and in fact in FIG. 1 the long right hand power output shaft 11 is shown as lying in such a position.

Particularly according to the present invention, a right hand portion of the long right hand power output shaft 11 extending to the right of the differential 3, i.e. an outer portion of said long right hand power output shaft 11 remote from the differential 3, is supported in the inner cylindrical hole 26 of an inner race 24 of a bearing device 16 which comprises an aligning device, said bearing device 16 itself being supported by a bracket 18 fixed to a fixed member of the vehicle incorporating this transmission, this member being, in fact, in the shown preferred embodiment of the transmission according to the present invention, the internal combustion engine 1 of said vehicle.

Now, in FIG. 2, in FIG. 3, and in FIG. 4, the more concrete structure of the particular bearing device and the particular aligning device utilized in the shown preferred embodiment of the transmission according to the present invention will be described. Parts of the preferred embodiment shown in FIG. 2, in FIG. 3, and in FIG. 4 which correspond to parts thereof shown in FIG. 1 are designated by the same reference numerals as are used in FIG. 1.

Figure 2:
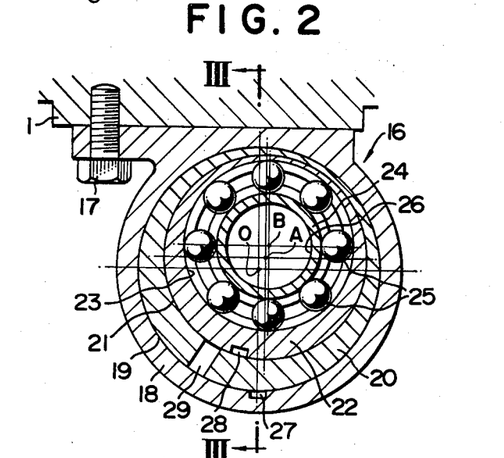
FIG. 2 is an end view of a bracket 18 and a bearing device 16 of the preferred embodiment of the transmission according to the present invention shown in FIG. 1, the plane of the drawing paper in FIG. 2 extending generally perpendicular to the central axis of said bearing device 16.
Figure 3:
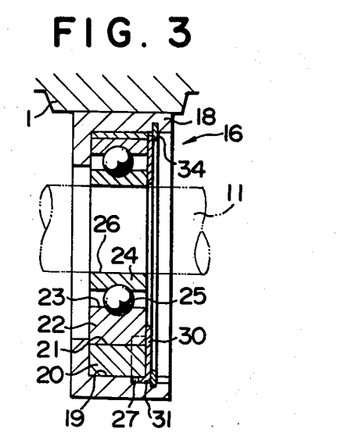
FIG. 3 is a sectional view through said bracket 18 and said bearing device 16, taken along a plane shown by the arrows III—III in FIG. 2.

In FIG. 2, there is shown an end view of the bracket 18 and the bearing device 16 and the alignment device therefor, the plane of the drawing paper extending generally perpendicular to the central axis of the inner race 24 of said bearing device 16, and in FIG. 3 there is shown a section taken through said bracket 18 and said bearing device 16 and the alignment device, taken along a plane shown by the arrows III—III in FIG. 2. The bracket 18 is, as previously mentioned, fixed firmly to the internal combustion engine 1, by a bolt 17 (actually, of course, by a plurality of such bolts 17, but only one such bolt 17 is visible in FIG. 2) which passes through a hole in the bracket 18 and which is screwed into a threaded hole provided in the block of said internal combustion engine 1. Within the bracket 18 there is formed a cylindrical hole 19, whose central axis extends generally substantially parallel to the aforesaid preferred power output line of said differential device 3, and the point of whose intersection with the plane of the drawing paper in FIG. 2 is designated by the reference symbol "O". In the inner cylindrical surface of the hole 19 in the bracket 18 there is formed a locating notch 27, for reasons which will become apparent later.

A first eccentric ring 20 is formed with a cylindrical outer surface which is of substantially the same radius as the inner cylndrical surface of the hole 19 in the bracket 18. The first eccentric ring 20 is snugly fitted within the hole 19 in the bracket 18, so as to coact closely therewith while being easily slidably rotatable therein, and accordingly the central axis of the outer cylindrical surface of the first eccentric ring 20 is coaxial with the central axis of the inner cylindrical surface of the hole 19, also passing through the point O. In the outer plane end surface of the first eccentric ring 20 there is formed an locating notch 29, the use of which will become apparent later. The first eccentric ring 20 is formed with a cylindrical hole 21, whose central axis lies parallel to the central axis of the outer cylindrical surface of said first eccentric ring 20. The inner cylindrical surface of the hole 21 is eccentrically offset from said outer cylindrical surface of said first eccentric ring 20, so that the central axis of said inner cylindrical surface of the hole 21 intersects the plane of the drawing paper in FIG. 2 at a point, designated by the reference symbol "A", which is offset from the point O by a certain distance OA, the magnitude of which is designated in the present explanation by "r", said magnitude of course being fixed.

A second eccentric ring 22 is formed with a cylindrical outer surface which is of substantially the same radius as the inner cylindrical surface of the hole 21 in the first eccentric ring 20. The second eccentric ring 22 is snugly fitted within the hole 21 in the first eccentric ring 20, so as to coact closely therewith while being easily slidably rotatable therein, and accordingly the central axis of the outer cylindrical surface of the second eccentric ring 22 is coaxial with the central axis of the inner cylindrical surface of the hole 21, also passing through the point A. In the outer cylindrical surface of the second eccentric ring 22 there is formed an locating notch 28, the use of which will become apparent later. The second eccentric ring 22 is formed with a cylindrical hole 23, whose central axis lies parallel to the central axis of the outer cylindrical surface of said second eccentric ring 22. The inner cylindrical surface of the hole 23 is eccentrically offset from said outer cylindrical surface of said second eccentric ring 22, so that the central axis of said inner cylindrical surface of the hole 23 intersects the plane of the drawing paper in FIG. 2 at a point, designated by the reference symbol "B", which is offset from the point A by a certain distance AB which of course is fixed. In the shown preferred embodiment of the transmission according to the present invention, the magnitude of this distance AB is substantially equal to that of the previously defined distance OA, i.e. is equal to r, for a reason which will be discussed later.

On the inner cylindrical surface of this cylindrical hole 23 in the second eccentric ring 22, extending around said cylindrical inner surface in the circumferential direction, there is formed a ball receiving groove, along which slide a plurality of balls 25 which are in fact held within a cage, and accordingly this second eccentric ring 22 functions as an outer ball race. A cylindrical inner race 24 is fitted inside these balls 25 and their cage, and the balls 25 slide in a ball receiving groove formed on the outside cylindrical surface of this inner race 24, in a per se well known way. Accordingly, the central axis of the inner race 24 is substantially coincident with the central axis of the cylindrical hole 23 in the second eccentric ring 22, and passes through the point B. A cylindrical hole 26 is formed through the inner race 24, and is coaxial with the outer cylindrical surface of the inner race 24. This cylindrical hole 26, as mentioned previously, supports an outer portion of the long right hand power output shaft 11 remote from the differential device 3.

Figure 4:
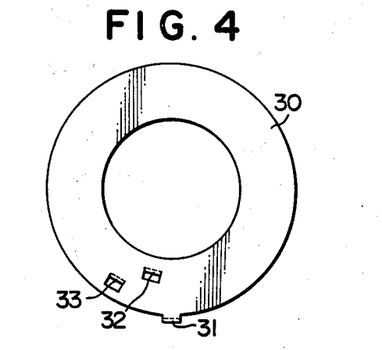
FIG. 4 is an axial end view of a locating plate 30 which can be seen in section in FIG. 3.

FIG. 4 is an axial end view of a locating plate 30 which can be seen in section in FIG. 3. This locating plate 30 is formed as a flat ring, whose outer radius is slightly smaller than the radius of the cylindrical hole 19 in the bracket 18, and whose inner radius is slightly larger than the sum of the aforementioned distances OA and AB, plus the radius of the long right hand power output shaft 11, for reasons which will become apparent later. As may be seen in FIG. 3, the locating plate 30 is received within the cylindrical hole 19 in the bracket 18, and rests against the plane end surfaces of the first eccentric ring 20 and the second eccentric ring 22. The axial extent of the cylindrical hole 19 is greater than the axial extents of the first and second eccentric rings 20 and 22, which are equal, and a snap ring 34, which is fitted into a snap ring groove cut into the inner surface of the cylindrical hole 19, holds the locating plate 30 and the first and second eccentric rings 20 and 22 within the cylindrical hole 19 against an inwardly extending lip at the end of the cylindrical hole 19 remote from said snap ring 34.

On the locating plate 30 there are formed three locating protuberances 31, 32, and 33, each of which extends for a short distance in the direction generally perpendicular to the plane of the locating plate 30. The locating protuberance 31, which according to the intended usage of this preferred embodiment of the transmission according to the present invention is formed in advance, is received into the locating notch 27 formed in the inner cylindrical surface of the hole 19 in the bracket 18, and accordingly by the action of this locating protuberance 31 the rotational position of the locating plate 30 is fixed with respect to the bracket 18. The locating protuberances 32 and 33 are, according to the intended usage of the shown preferred embodiment of the transmission according to the present invention, not formed at the time of manufacture of the locating plate 30, but are formed later, during assembly of the transmission system to the vehicle of which it is to form a part, in positions on the locating plate 30 suitable for properly aligning the long right hand power output shaft 11, as will be explained in detail later. This formation of the protuberances 32 and 33 may be performed, at this later stage, by indenting the locating plate 30 with a hammer and chisel, for example.

The locating protuberance 32 is received into the locating notch 28 formed in the outer cylindrical surface of the second eccentric ring 22, and, since the rotational position of the locating plate 30 is fixed with respect to the brackt 18 by the operation of the locating protuberance 31, as explained above, therefore the rotational position of the second eccentric ring 22 is fixed with respect to the bracket 18. Similarly, the locating protuberance 33 is received into the locating notch 29 formed in the outer plane end surface of the first eccentric ring 20, and, since the rotational position of the locating plate 30 is fixed with respect to the bracket 18, therefore the rotational position of the first eccentric ring 20 is fixed with respect to the bracket 18. Thus, by the action of the locating plate 30, the rotational positions of both the first and the second eccentric rings 20 and 22 are fixed with respect to the bracket 18, and thus the eccentric rings 20 and 22 cannot rotate with respect to the bracket 18. In fact, the provision of the locating plate 30 is not essential to the present invention; if the first eccentric ring 20 is so tightly fitted within the cylindrical hole 19 of the bracket 18 as not to be rotatable therein during operation of the vehicle, for instance by rotational forces inevitably exerted thereon by the rotation of the long right hand power output shaft 11, and if similarly the second eccentric ring 22 is so tightly fitted within the cylindrical hole 21 of the first eccentric ring 20 as not to be rotatable therein during operation of the vehicle, then the locating plate 30 may be dispensed with, without prejudice to the essential principles of the present invention.

Figure 5:
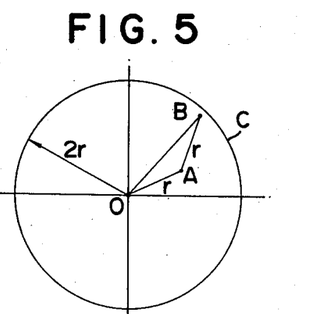
FIG. 5 is a geometrical diagram, showing the relations of points in the plane of the drawing paper in FIG. 2, provided in order to illustrate the mathematical principles behind the operation of the shown preferred embodiment of the transmission according to the present invention.

FIG. 5 is a geometrical diagram, showing the relations of points in the plane of the drawing paper in FIG. 2, provided in order to illustrate the mathematical principles behind the operation of the shown preferred embodiment of the transmission according to the present invention, and will be used to explain how the preferred embodiment of the transmission according to the present invention is intended to be used in practice. The offset between the central axis of the cylindrical hole 21 in the first eccentric ring 20, and the central axis of the cylindrical hole 19 in the bracket 18, which can be represented by OA, taken as a vector quantity, is of fixed magnitude equal to r, but of course may be freely varied in direction, by rotating the first eccentric ring 20 within the hole 19 of the bracket 18, this of course before applying the locating plate 30 to the construction to provide the assembly shown in FIG. 3. Similarly, the offset between the central axis of the cylindrical hole 23 in the second eccentric ring 22 and the central axis of the cylindrical hole 21 in the first eccentric ring 20, which can be represented by OB, taken as a vector quantity, is of fixed magnitude equal to r, but may be freely varied in direction, by rotating the second eccentric ring 22 within the hole 21 of the first eccentric ring 20 before applying the locating plate 30. Thereby, the offset between the central axis of the cyindrical hole 23 in the second eccentric ring 22 and the central axis of the cylindrical hole 19 in the bracket 18, which can be represented by OB, taken as a vector quantity which is the sum of the vector quantities OA and OB, may be freely varied both in magnitude and in direction, by varying the directions of the vector quantities OA and AB, except that the magnitude of said offset represented by the vector quantity OB cannot be made to exceed 2r. In other words, the point B, which represents the position of the central axis of the cylindrical hole 23 in the second eccentric ring 22 (which is the same as the position of the central axis of the long right hand power output shaft 11) can be arbitrarily positioned within the circle C of radius 2r about the point O which represents the position of the central axis of the cylindrical hole 19 in the bracket 18.

The reason that the magnitude of the vector OA and the magnitude of the vector AB are made to be equal, in the shown preferred embodiment of the transmission according to the present invention, i.e. that the magnitude of the offset between the central axis of the cylindrical hole 21 in the first eccentric ring 20 and the central axis of the outer cylindrical surface of said first eccentric ring 20, and the magnitude of the offset between the central axis of the cylindrical hole 23 in the second eccentric ring 22 and the central axis of the outer cylindrical surface of said second eccentric ring 22, are both made to be equal, is as follows. If these magnitudes were not equal, but differed by a certain non zero amount, then it would be impossible, no matter how the directions of the vectors OA and AB were chosen, for the magnitude of the vector sum thereof, i.e. the magnitude of the vector OB, to be reduced to less than said non zero amount, and accordingly the area within the diagram of FIG. 5 within which the point B might be arbitrarily arranged to lie would not be circular like the circle C, but would be ring shaped, which would be unsatisfactory. In other words, it would be impossible to make the central axis of the cylindrical hole 23 in the second eccentric ring 22, i.e. the central axis of the long right hand power output shaft 11, lie closer to the central axis of the cylindrical hole 19 in the bracket 18 than a certain minimum distance.

The reason for the radius of the hole through the center of the locating plate 30 to be formed slightly larger than the sum of the aforementioned distances OA and AB, i.e., in the shown preferred embodiment, 2r, plus the radius of the long right hand power output shaft 11, is so as to allow the central axis of the long right hand power output shaft 11 to be offset to the greatest amount possible, i.e. 2r, from the central axis of the cylindrical hole 19 through the bracket 18, which of course is done by positioning the first and second eccentric rings 20 and 22 so that the vectors OA and AB have the same direction.

The method of use of this aligning device is as follows. During assembly of the vehicle to which this transmission system is to be fitted, first the internal combustion engine 1, with the transmission 2 and the differential 3, are fitted to the vehicle, and the bracket 18 is bolted by the bolts such as 17 to the internal combustion engine 1. Now, at this time, as explained above, because of inevitable variations in the dimensions of the various parts such as the castings which constitute the engine block and the gearbox and differential casings, and because of variations of the dimensions of the bracket 18, and of the gaskets which are interposed between these various parts, although the central axis of the cylindrical hole 19 through the bracket 18 will be approximately parallel to the above defined preferred power output line of the differential device 3, there will inevitably be a certain offset therebetween. It is necessary for the operation of the aligning means comprised in the shown preferred embodiment of the transmission according to the present invention that the magnitude of this offset should be less than or equal to the distance 2r, and, provided that this is the case, it is easy to select the directions of the vector quantities OA and AB, i.e. to select the angular positions of the first and second eccentric rings 20 and 22 with respect to the bracket 18 and with respect to one another, so as to cancel this offset, i.e. so as to make the central axis of the hole 26 through the inner race 24 of the bearing device (which is the same as the central axis of the cylindrical inner surface of the hole 23 through the second eccentric ring 22, and is the same as the central axis of the long right hand power output shaft 11) coincide with the preferred power output line of the differential device 3.

When the first and second eccentric rings 20 and 22 have been set to these positions, then using tools such as a hammer and chisel the locating protuberances 32 and 33 are formed on the locating plate 30, as indentations in positions angularly located with respect to the already formed locating protuberance 31 as corresponding to the currently set positions of the locating notches 28 and 29 with respect to the locating notch 27. Next, the locating plate 30 is fitted into the end of the cylindrical hole 19 in the bracket 18, as shown in FIG. 2, resting snugly against the plane end surfaces of the first and second eccentric rings 20 and 22, with the locating protuberances 31, 32, and 33 respectively entering into the locating notches 27, 29, and 28, and then the snap ring 34 is fitted into its retaining groove within the cylindrical hole 19 of the bracket 18, so as to retain the locating plate 30 and the first and second eccentric rings 20 and 22 within the hole 19. Finally, the long right hand power output shaft 11 is fitted through the cylindrical receiving hole 26 formed in the inner race 24, and its left hand end in FIG. 1 is approached to the differential device 3 and rotationally coupled to a power output member thereof, for example by splines.

It will be clear that this procedure will ensure that the central axis of the long power output shaft 11 will substantially coincide with the preferred power output line of the differential device 3, and accordingly no undue strain such as a sideways force will be placed on any of the members of the differential device 3 such as bearing devices or meshed gear systems. Further, as a result of this, the lifespan of the differential device 3 during use is enabled to be maximized, and the risk of production of unpleasant and annoying humming noise during operation of the differential device 3 is reduced. Also the production of deleterious vibration during operation is effectively curtailed. Thus the reliability of the differential device is increased. This has been done without unduly increasing the number of splined joints in the power train, thereby minimizing the risk of any undesirable clonking sound being produced during operation of the transmission, especially when starting the vehicle incorporating the transmission from rest, and also has been done without unduly increasing the weight of the transmission system, or its complexity or manufacturing cost. Because of the provision of the aliging device comprising the first and second eccentric rings 20 and 22, the bracing construction comprising the bracket 18 can be simply and easily adjusted, and no unduly high machining accuracy is required for its parts during manufacture. The provision of the fixing system incorporating the locating plate 30 ensures that the adjustment of the aligning device can be fixed, when such adjustment has been properly made. Because of the fact that the positions of the locating protuberances 32 and 33 are fixed, once these protuberances have been formed on the locating plate 30, the adjustment of the aligning device is fixed, once it has been set. However, because it is easy to change the locating plate 30 for a new one, it is reasonably easy to readjust the aligning device, during servicing of the vehicle incorporating this transmission.

Although the present invention has been shown and described with reference to a preferred embodiment thereof, and in terms of the illustrative drawings, it should not be considered as limited thereby. Various possible modifications, omissions, and alterations could be conceived of by one skilled in the art to the form and the content of any particular embodiment, without departing from the scope of the present invention. Therefore it is desired that the scope of the present invention, and the protection sought to be granted by Letters Patent, should be defined not by any of the perhaps purely fortuitous details of the shown embodiment, or of the drawings, but solely by the scope of the appended claims, which follow.

What is claimed is:

1. In a vehicle comprising two axially opposed driven wheels and a fixed member, a transmission comprising:
   (a) two drive shafts of equal length, each flexibly drivingly coupled at its outer end to one of said wheels;
   (b) a differential axially located closer to a first one of said wheels and further from the other one of said wheels, defining a preferred power output line for power output to said other one of said wheels, and comprising:
      (b1) a short power output shaft extending towards said first wheel and flexibly drivingly coupled at its outer end to the inner end of the one of said drive shafts whose outer end is drivingly coupled to said first wheel; and
      (b2) a long power output shaft extending towards said other wheel substantially along said preferred power output line and flexibly drivingly coupled at its outer end to the inner end of the one of said drive shafts whose outer end is drivingly coupled to said other wheel; and
   (c) a support device comprising:
      (c1) a bearing, comprising an inner race which supports a part of said long power output shaft remote from said differential, and an outer race which rotatably supports said inner race;
      (c2) a support member, which supports said outer race of said bearing so that said inner race is rotatable about a rotational axis substantially parallel to said preferred power output line, and which is coupled to said fixed member of said vehicle; and
      (c3) a means for adjusting the position of said rotational axis of said inner race of said bearing with respect to the position of said preferred power output line, in the plane substantially perpendicular to said rotation axis of said inner race, with two degrees of freedom, and for fixing said adjusted position; said adjusting means comprising a first movable member which is movable with respect to said support member with one degree of freedom, and a second movable member which is movable with respect to said first movable member with one degree of freedom, said movement of said first movable member with respect to said support member altering the position of said second movable member with respect to said fixed member, and said second movable member supporting said outer race of said bearing in a fixed relation to said second movable member, said movement of said second movable member with respect to said first movable member altering the position of said outer race with respect to said first movable member; said adjusting means further comprising means for fixing the position of said first movable member with respect to said support member, and for fixing the position of said second movable member with respect to said first movable member; so that said adjusted position of said rotational axis of said inner race of said bearing may be fixed after it has been adjusted;
   (d) whereby, by adjusting said adjusting means so as to bring said rotational axis of said inner race of said bearing, and also the rotational axis of said long power output shaft of said differential which is supported thereby, to be substantially coincident with said preferred power output line of said differential, thus compensating for offset in the positioning of said support member, power output from said differential to said long power output shaft may be performed substantially along said preferred power output line, thus minimizing wear on, and maximizing the lifespan of, said differential, and also minimizing side strain on said bearing.

2. A transmission according to claim 1, in which, by the operation of said adjusting means, the position of said rotational axis of said inner race of said bearing with respect to said preferred power output line may be adjusted, in said plane perpendicular to said rotational axis of said inner race, to any position whose distance from said preferred power output line is less than or equal to a certain predetermined value; whereby adjustability of said adjustment means may be maximized, and the position of said rotational axis of said inner race of said bearing may be adjusted to compensate for any offset in the position of said support member less than said certain predetermined value.

3. A transmission according to claim 1, wherein, by the operation of said adjusting means, the position of said rotational axis of said inner race of said bearing with respect to said support member may be adjusted, in said plane perpendicular to said rotational axis of said inner race, to any position whose distance from a central position is less than or equal to a certain predetermined value; whereby adjustability of said adjustment means may be maximized, and the position of said rotational axis of said inner race of said bearing may be adjusted to compensate for any offset in the position of said support member less than said certain predetermined value.

4. A transmission according to claim 1, wherein said first movable member is a ring member, formed with an outer cylindrical surface which is fitted into and cooperates with a corresponding inner cylindrical surface of a first hole formed in said support member, so as to slidably rotate thereon, and also formed with a second hole which has an inner cylindrical surface whose central axis is parallel to the central axis of said outer cylindrical surface of said first movable member and is offset therefrom by a first distance; and wherein said second movable member is formed with an outer cylindrical surface which is fitted into and cooperates with said inner cylindrical surface of said second hole in said first movable member so as to slidably rotate thereon; said outer race of said bearing being supported by said second movable member in a fixed relation to said second movable member in such a position that the rotational axis of said inner race of said bearing is parallel to the central axis of said outer cylindrical surface of said second movable member and is offset therefrom by a second distance; whereby, by suitably rotating said first movable member with respct to said support member, by sliding said outer cylindrical surface of said first movable member on said inner cylindrical surface of said first hole in said support member, and by suitably rotating said second movable member with respect to said first movable member, by sliding said outer cylindrical surface of said second movable member on said inner cylindrical surface of said second hole in said first movable member, said rotational axis of said inner race of said bearing can be moved with respect to said support member, with two degrees of freedom.

5. A transmission according to claim 4, wherein said first distance is substantially equal to said second distance; whereby, by suitably rotating said first movable member with respect to said support member, by sliding said outer cylindrical surface of said first movable member on said inner cylindrical surface of said first hole in said support member, and by suitably rotating said second movable member with respect to said first movable member, by sliding said outer cyndrical surface of said second movable member on said inner cylindrical surface of said second hole in said first movable member, said rotational axis of said inner race of said bearing can be brought so as substantially to coincide with said central axis of said outer cylindrical surface of said first movable member.

6. A transmission according to claim 1, wherein said fixing means comprises a locating plate which is formed with a first engaging shape which engages with a shape on said support member, a second engaging shape which engages with a shape on said first movable member, and a third engaging shape which engages with a shape on said second movable member; whereby the relative positions of said support member, said first movable member, and said second movable member may be fixed, by engaging said locating plate thereto.

7. A transmission according to either one of claims 4 and 5, further comprising a locating plate which is formed with a first engaging shape which engages with a shape on said support member, a second engaging shape which engages with a shape on said first movable member, and a third engaging shape which engages with a shape on said second movable member, said locating plate being received into said first hole formed in said support member, and further comprising a retaining member which retains said locating plate in said first hole.

8. A transmission according to claim 1, wherein said outer race of said bearing is directly integrally formed in said second movable member.

9. In a vehicle comprising two axially opposed driven wheels and an engine, a transmission firmly connected with said engine, comprising:
(a) two drive shafts of equal length, each flexibly drivingly coupled at its outer end to one of said wheels;
(b) a differential axially located closer to a first one of said wheels and further from the other one of said wheels, defining a preferred power output line for power output to said other one of said wheels, and comprising:
(b1) a short power output shaft extending towards said first wheel and flexibly drivingly coupled at its outer end to the inner end of the one of said drive shafts whose outer end is drivingly coupled to said first wheel; and
(b2) a long power output shaft extending towards said other wheel substantially along said preferred power output line and flexibly drivingly coupled at its outer end to the inner end of the one of said drive shafts whose outer end is drivingly coupled to said other wheel; and
(c) a support device comprising:
(c1) a bearing comprising an inner race which supports a part of said longer power output shaft remote from said differential, a plurality of bearing balls and an outer race which rotatably supports said inner race via said bearing balls;
- (c2) a support member for supporting said bearing from said engine, said support member being formed with a hole having a first cylindrical inner surface whose axis is substantially parallel to said preferred power output line,
- (c3) a first eccentric ring member having a first cylindrical outer surface fitted into said first cylindrical inner surface of said support member and a second cylindrical inner surface whose axis is parallelly offset from the axis of said first cylindrical outer surface by a first distance,
- (c4) a second eccentric ring member having a second cylindrical outer surface fitted into said second cylindrical inner surface of said first eccentric ring member and constituting said outer race with the axis of said outer race being parallelly offset from the axis of said second cylindrical outer surface by a second distance, wherein said first and said second distance are so determined that by properly rotating said first ring member relative to said support member and said second ring member relative to said first ring member the axis of said inner race is brought to coincide with said preferred power output line.

10. A transmission according to claim 9, wherein said first and said second distance are equal to each other and are not smaller than a half of the offset between the axis of said first cylindrical inner surface and said preferred power output line.

11. In a vehicle comprising two axially opposed driven wheels and an engine, a transmission firmly connected with said engine, comprising:
- (a) two drive shafts of equal length, each flexibly drivingly coupled at its outer end to one of said wheels;
- (b) a differential axially located closer to a first one of said wheels and further from the other one of said wheels, defining a preferred power output line for power output to said other one of said wheels, and comprising:
  - (b1) a short power output shaft extending towards said first wheel and flexibly drivingly coupled at its outer end to the inner end of the one of said drive shafts whose outer end is drivingly coupled to said first wheel; and
  - (b2) a long power output shaft extending towards said other wheel substantially along said preferred power output line and flexibly drivingly coupled at its outer end to the inner end of the one of said drive shafts whose outer end is drivingly coupled to said other wheel; and
- (c) a support device comprising:
  - (c1) a bearing comprising an inner race which supports a part of said longer power output shaft remote from said differential, a plurality of bearing balls and an outer race which rotatably supports said inner race via said bearing balls;
  - (c2) a support member for supporting said bearing from said engine, said support member being formed with a hole having a first cylindrical inner surface whose axis is substantially parallel to said preferred power output line,
  - (c3) a first eccentric ring member having a first cylindrical outer surface fitted into said first cylindrical inner surface of said support member and a second cylindrical inner surface whose axis is parallelly offset from the axis of said first cylindrical outer surface by a first distance,
  - (c4) a second eccentric ring member having a second cylindrical outer surface fitted into said second cylindrical inner surface of said first eccentric ring member and supporting said outer race with the axis of said outer race being parallelly offset from the axis of said second cylindrical outer surface by a second distance, wherein said first and said second distance are so determined that by properly rotating said first ring member relative to said support member and said second ring member relative to said first ring member the axis of said inner race is brought to coincide with said preferred power output line; and a means for fixing the position of said first ring member with respect to said support member and for fixing the position of said second ring member with respect to said first ring member, said fixing means comprising a locating plate which is formed with a first engaging part which engages with a part on said support member, a second engaging part which engages with a part on said first ring member, and a third engaging shape which engages with a part on said second ring member.

* * * * *